(12) United States Patent
Vignoli

(10) Patent No.: US 6,588,478 B2
(45) Date of Patent: Jul. 8, 2003

(54) TIRE REMOVAL MACHINE

(75) Inventor: Giuliano Vignoli, Modena (IT)

(73) Assignee: Societa' Italiana Construzioni Elettromeccaniche-S.I.C.E.-S.p.A., Reggio Emilia (IT)

(*) Notice: Subject to any disclaimer, the term of this patent is extended or adjusted under 35 U.S.C. 154(b) by 0 days.

(21) Appl. No.: 09/954,297

(22) Filed: Sep. 18, 2001

(65) Prior Publication Data

US 2002/0046814 A1 Apr. 25, 2002

(30) Foreign Application Priority Data

Oct. 24, 2000 (IT) .................................. RE2000A0102

(51) Int. Cl.[7] .............................................. B60C 25/07
(52) U.S. Cl. ...................................... 157/1.28; 157/1.17
(58) Field of Search ........................... 157/1, 1.17, 1.26, 157/1.28

(56) References Cited

U.S. PATENT DOCUMENTS

| | | | | |
|---|---|---|---|---|
| 4,293,020 A | * | 10/1981 | Leeper et al. ............... | 157/1.28 |
| 5,226,465 A | * | 7/1993 | Schon et al. ................ | 157/1.28 |
| 6,056,034 A | | 5/2000 | Matnick | |

FOREIGN PATENT DOCUMENTS

| | | |
|---|---|---|
| CH | 417 373 | 7/1966 |
| EP | 0 482 701 A2 | 4/1992 |

* cited by examiner

Primary Examiner—James G. Smith
(74) Attorney, Agent, or Firm—Browdy and Neimark, P.L.L.C.

(57) ABSTRACT

The machine comprises a working station (P) and a fixed bed (10) disposed to the rear side of the working station (P). For rotating a wheel (20) there is provided a unit which is carried by a support bracket (30) connected to the fixed bed (10) in such a manner as to be able to swivel about a horizontal axis (A) passing through the working station (P), and comprises, for rigidly locking the wheel rim, a motorized mandrel (32) disposed with its axis (B) perpendicular to and cutting or nearly cutting the swivel axis (A), so that the tire of the wheel (20) carried by the mandrel (32) is traversed, in a virtually central position, by the swivel axis (A) of the support bracket (30). The machine also comprises means (12) for swivelling the support bracket (30) between two operative positions, in the first of which the axis of rotation (B) of the wheel is disposed in a horizontal position, and in the second of which the axis of rotation (B) of the wheel is disposed in a vertical position. To the fixed bed (10) there are applied bead release means (45) connected in such a manner as to be able to assume a working position and an exclusion position alternately, and tire mounting/removal tool holder means (50) connected in such a manner as to be able to assume a working position and an exclusion position alternately.

6 Claims, 6 Drawing Sheets

TIRE REMOVAL MACHINE

BACKGROUND OF THE INVENTION

1. Technical Field of the Invention

This invention relates to a tire removal machine.

More specifically, the invention relates to a type of tire removal machine comprising a fixed bed, close to which there are provided two working stations, one for tire bead release from the wheel rim and one for removing the tire from and for mounting the tire on the wheel rim, and comprising a wheel rotation unit having a motorized mandrel provided with means for rigidly locking the wheel rim coaxially to the mandrel axis. The mandrel is carried by support means swivelling between two positions: a first position in which the mandrel is horizontal and the wheel lies in the bead release station, and a second position in which the mandrel is brought into a vertical position and the wheel lies in the mounting/removal station. In the bead release station, suitable bead release means are provided for operating on the wheel carried by the mandrel, the other station being provided with suitable means for mounting/removing the tire on and from the wheel rim.

2. Prior Art

This type of machine has various advantages over more traditional machines with a fixed horizontal work bench on which a vertical mandrel is provided; in particular, positioning the wheel on the mandrel is manually much simpler and less fatiguing, as the wheel does not have to be raised manually onto the work bench.

However this type of machine requires considerable space, mainly because it involves two separate working stations. This is a very considerable drawback because the premises where these machines are used are usually relatively small. An object of the present invention is to provide a machine of the aforesaid type, in which the space occupied by the machine is much smaller than known machines of the same type.

OBJECT AND SUMMARY OF THE INVENTION

This and further objects are attained by the present invention wherein the machine of the invention comprises:

a working station;

a fixed bed disposed on the rear side of the working station;

for rotating a wheel, a unit carried by a support bracket connected to the fixed bed in such a manner as to be able to swivel about a horizontal axis passing through the station, and comprising, carried by and projecting from said support bracket, a motorized mandrel which is provided with means for rigidly locking the wheel rim and is disposed with its axis perpendicular to and cutting or nearly cutting the swivel axis, so that the tire of the wheel carried by the mandrel is traversed, in a virtually central position, by the swivel axis of the support bracket;

means for swivelling the support bracket between two operative positions, in the first of which the axis of rotation of the wheel is disposed in a horizontal position, and in the second of which the axis of rotation of the wheel is disposed in a vertical position;

bead release means connected to the fixed bed in such a manner as to be able to assume a working position, in which they are operative on the wheel positioned in the working station in the first operative position, and a second retracted position alternately;

tire mounting/removal tool holder means connected to the fixed bed in such a manner as to be able to assume a working position, in which they are operative on the wheel positioned in the working station in the second operative position, and a second retracted position alternately.

In passing from one operative position to the other, the wheel swivels about a virtually diametrical axis passing virtually through the geometrical centre of the wheel, and consequently, although changing orientation (its axis passes from horizontal to vertical and vice versa), it is always maintained in the same working station.

BRIEF DESCRIPTIONS OF THE DRAWINGS

The invention is described in detail hereinafter with the aid of the accompanying figures, which illustrate a non-exclusive embodiment thereof by way of example.

DETAILED EMBODIMENT OF THE PREFERRED EMBODIMENT(S) OF THE INVENTION

The machine of the invention comprises a single working station (indicated overall by P) in which an operator can act and in which the operations, namely the bead release, and the removal and mounting of the tire from and onto the wheel rim, are carried out.

On the rear side of the station P there is a fixed bed 10, having an upwardly extending rear portion 10a and a substantially horizontal flat base 10b which extends into the lower part of the station P.

Figure 1:
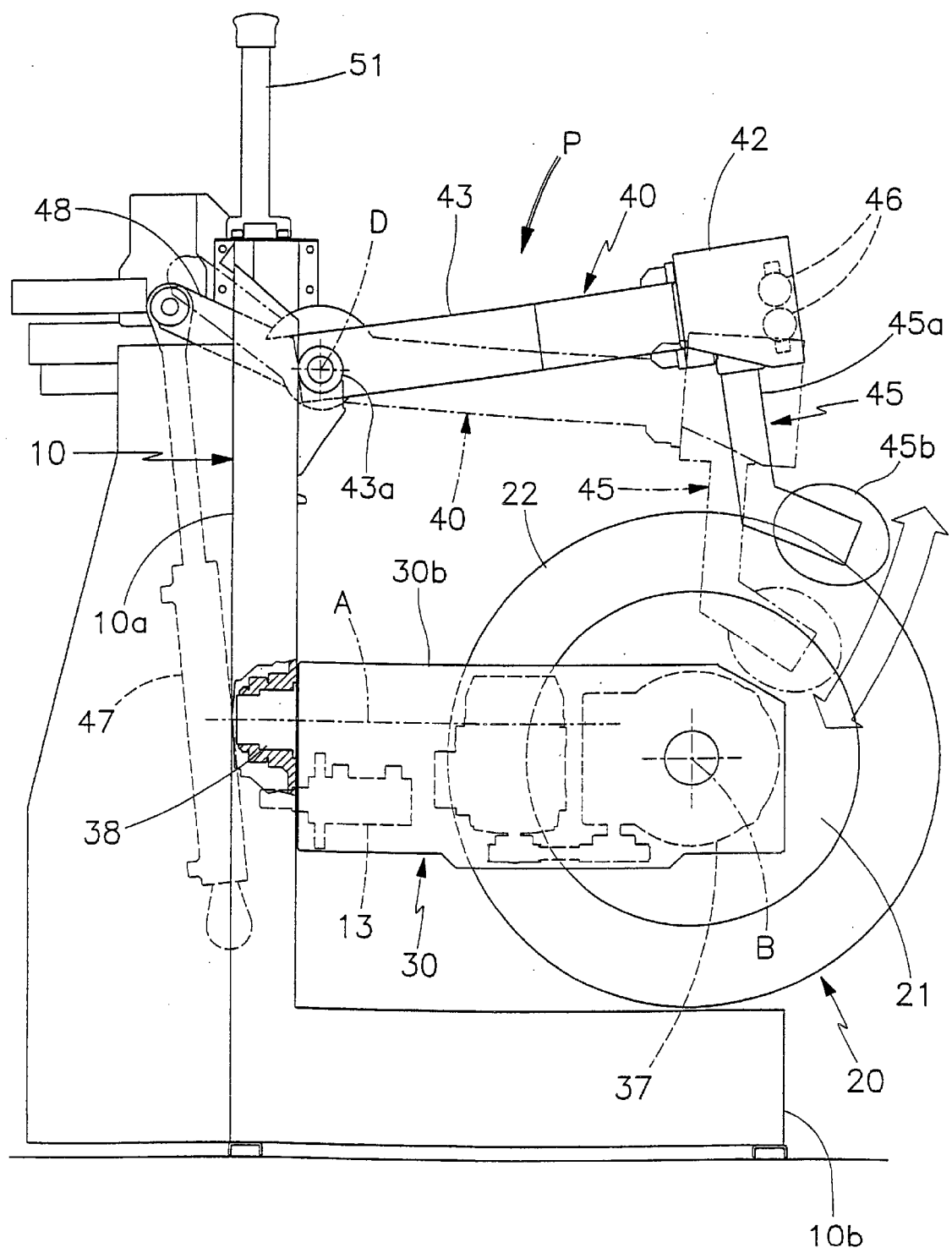
FIG. 1 is a side view, in vertical elevation, of the machine in the bead release configuration.
Figure 1A:
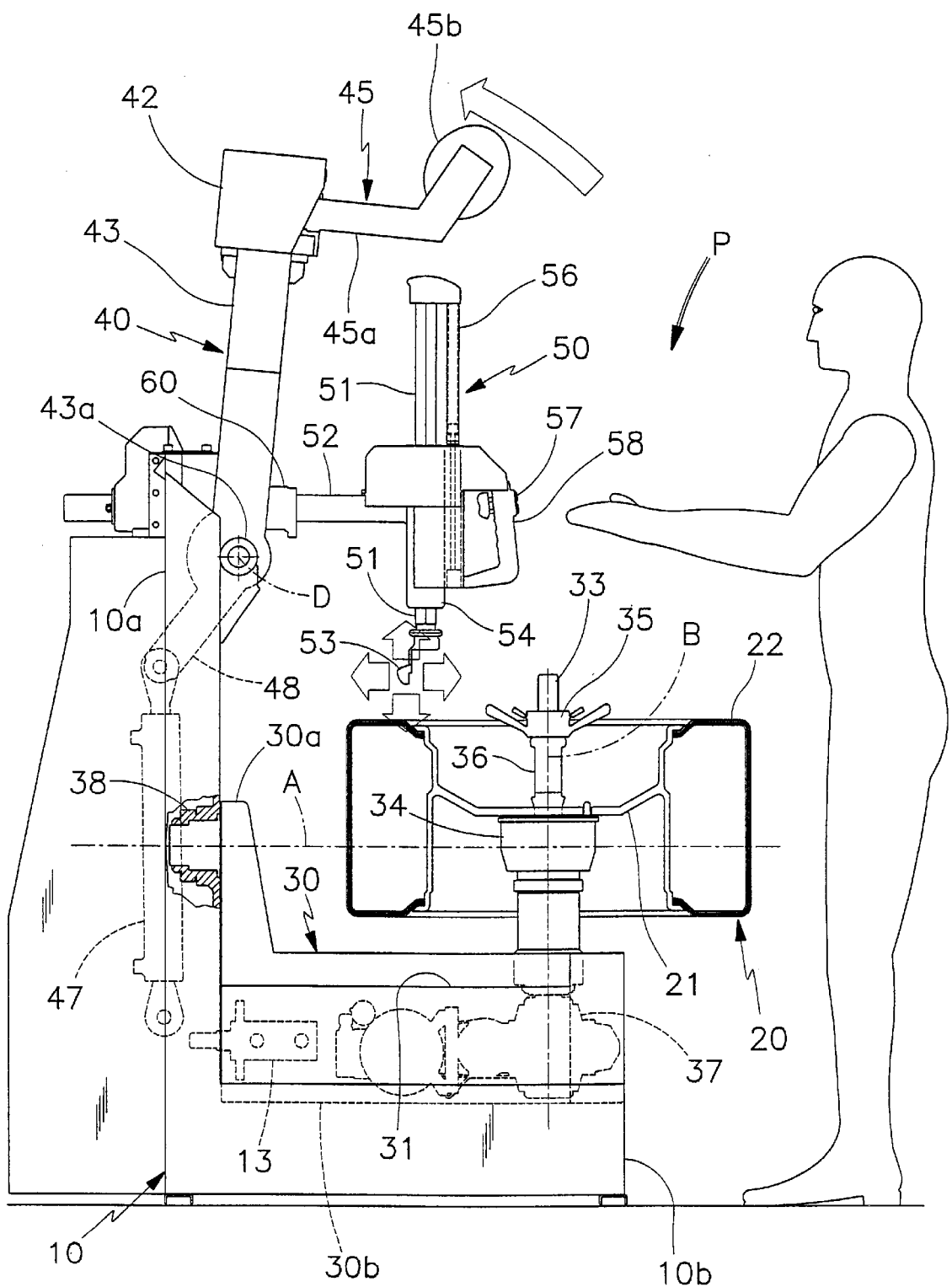
FIG. 1A is a side view, in vertical elevation, of the machine in the tire mounting/removal configuration.

The machine also comprises, for rotating a wheel 20, a unit carried by a support bracket 30 connected to the fixed bed 10 such as to be able to be swivelled about a horizontal axis A passing through the working station P. In detail, the bracket 30 has an L-shaped overall profile (see FIG. 1A in particular), consisting of a vertically extending rear portion 30a pivoted by a pin 38 to the rear portion 10a of the fixed bed, and a horizontally extending portion 30b joined to the portion 30a and projecting through the station P.

The horizontal portion 30b of the support bracket 30 carries, projecting from its upper surface 31, a motorized mandrel 32 provided with means for rigidly locking the wheel rim 21. Specifically, the mandrel 32 comprises a motorized shaft 33 having a threaded free end, a counteracting element 34 rigid with the shaft, and a locking nut 35 which engages on the threaded end and acts on the wheel rim 21 via a sleeve 36, to rigidly lock the wheel rim against the counteracting element 34. The motorized mandrel 32 projects perpendicularly from the upper surface 31 of the bracket 30 and has its axis B perpendicular to and cutting or nearly cutting the swivel axis A, so that the tire 22 of the wheel 20 carried by the mandrel lies at a distance from the surface 31 of the bracket 30 and is traversed, virtually through its geometrical centre, by the swivel axis A of the support bracket 30. The mandrel 32 is rotated by a geared motor unit 37 positioned inside the horizontal portion 30b of the bracket 30.

Figure 2:
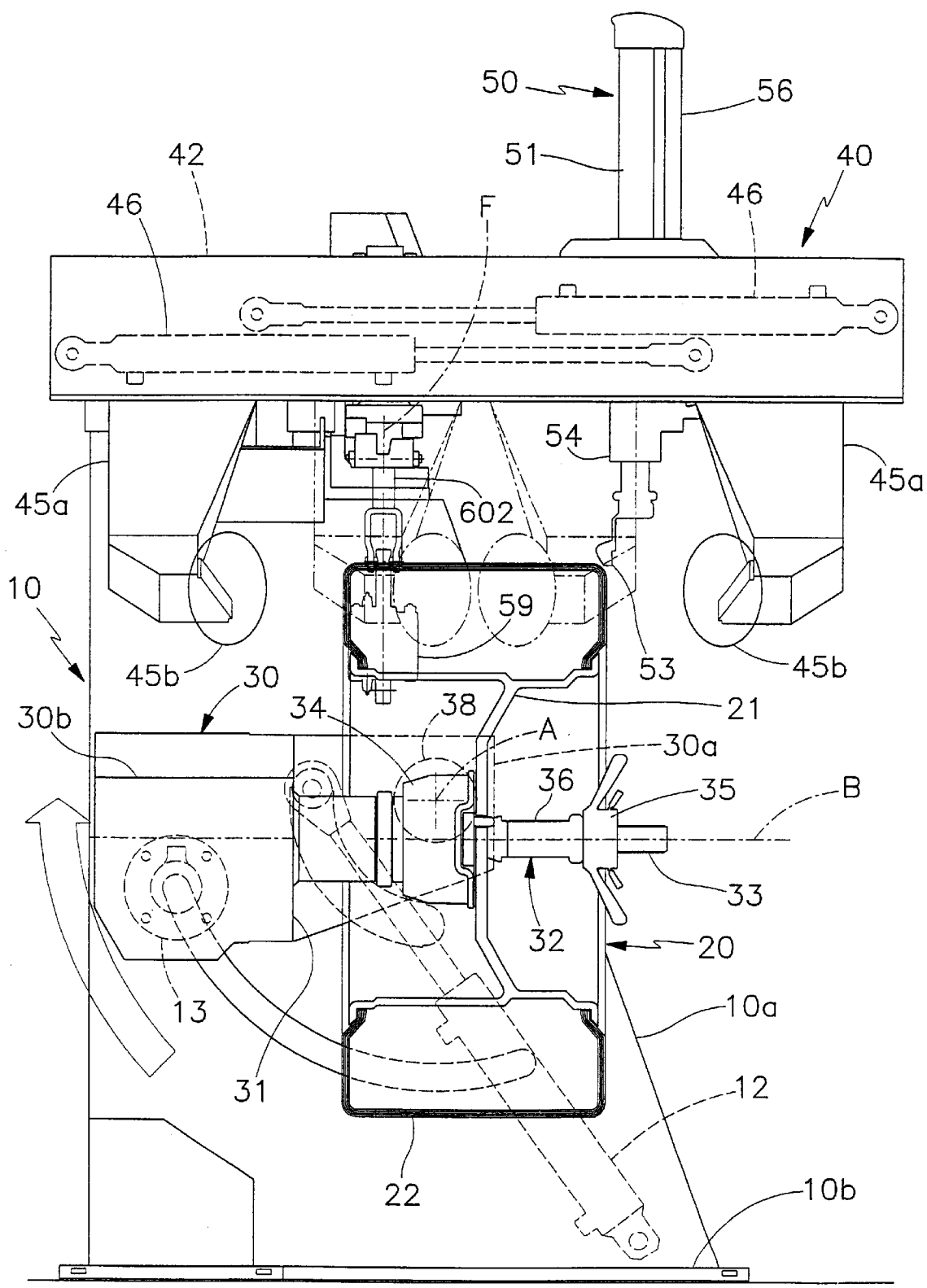
FIG. 2 is a front view, in vertical elevation, of the machine in the bead release configuration.
Figure 2A:
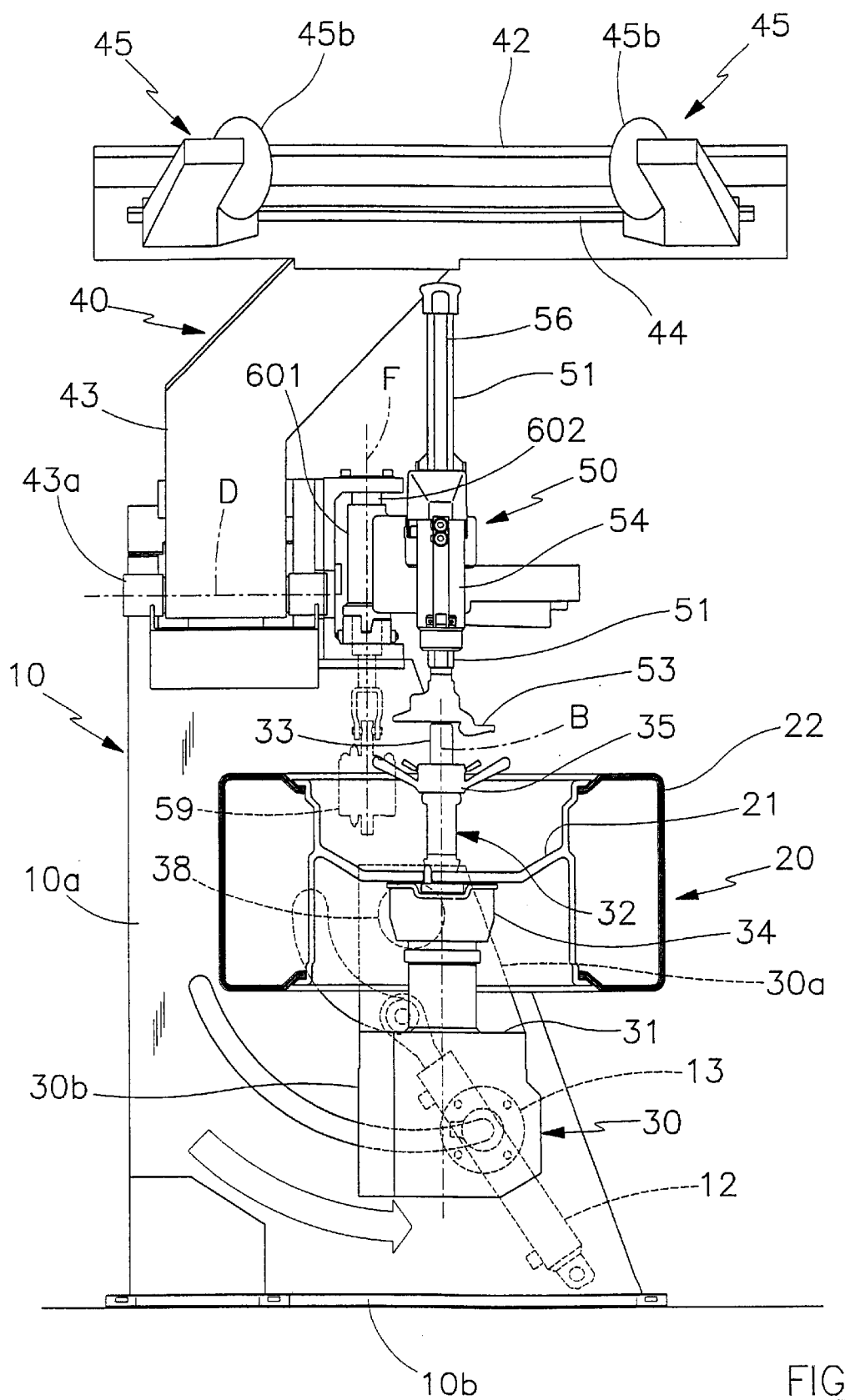
FIG. 2A is a front view, in vertical elevation, of the machine in the tire mounting/removal configuration.
Figure 3:
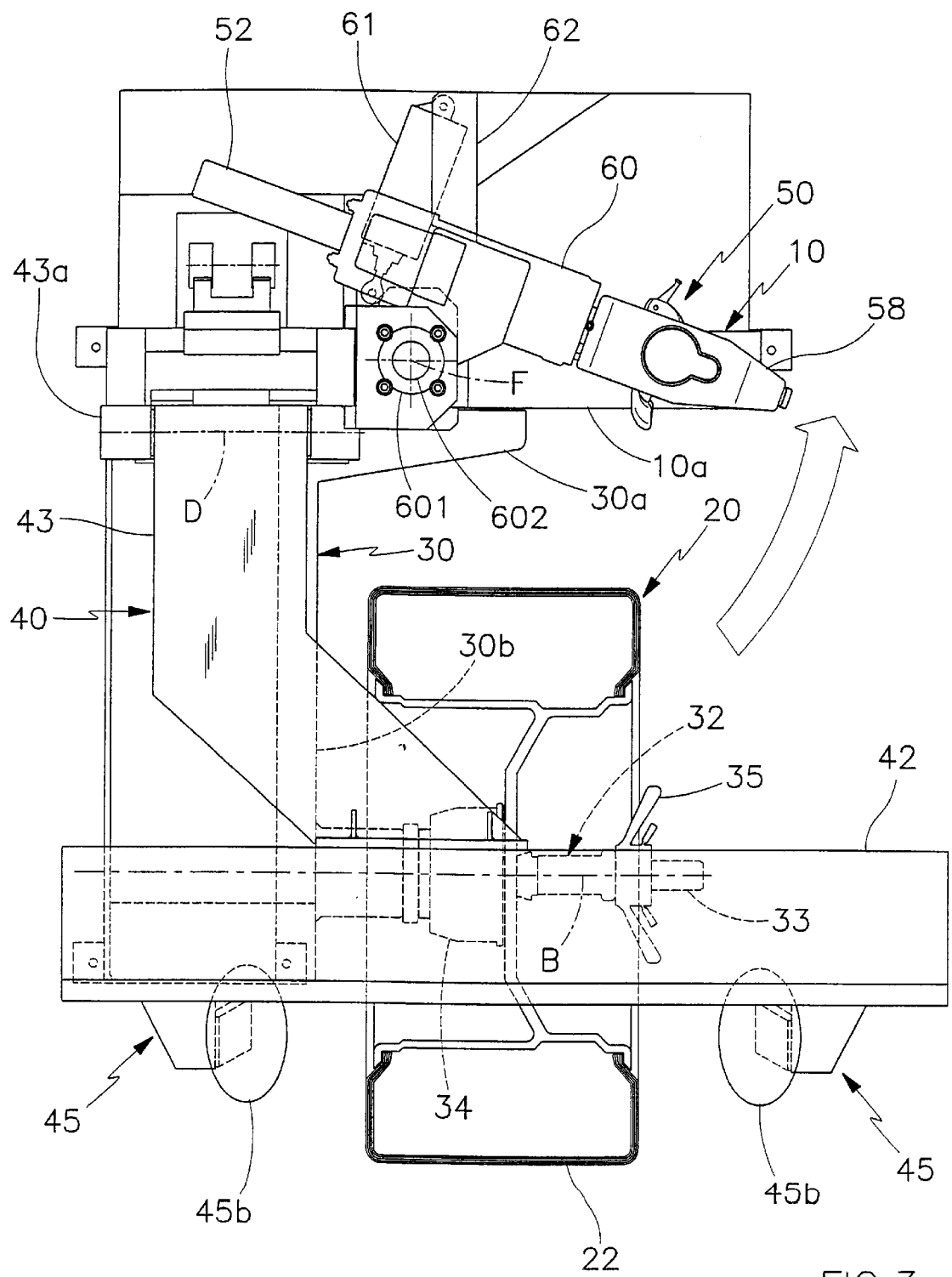
FIG. 3 is a plan view of the machine in the bead release configuration, seen from above.
Figure 3A:
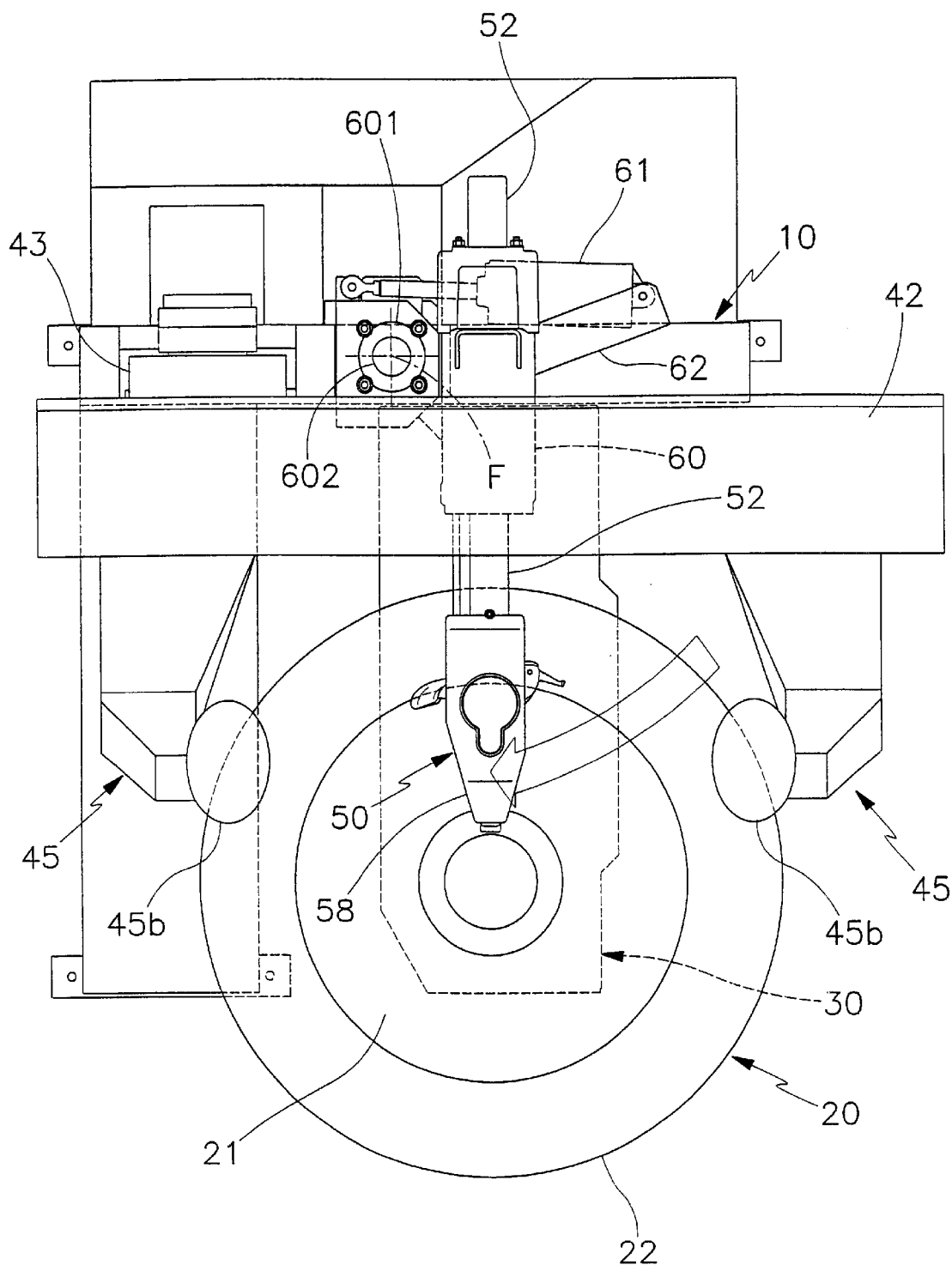
FIG. 3A is a plan view of the machine in the tire mounting/removal configuration, seen from above.

The bracket 30 and all the elements carried by it can rotate about the horizontal axis A of the pin 38. Specifically, the bracket 30 can swivel between two operative positions, in the first of which the axis of rotation B of the wheel 20 is disposed horizontally (see FIGS. 1, 2 and 3), and in the second of which (displaced through 90 degrees from the first) the axis of rotation B of the wheel 20 is disposed vertically (see FIGS. 1A, 2A and 3A). In both these positions the wheel 20, although changing orientation, is always maintained within the station P (above the base 10b) and always maintains its centre more or less in the same spatial position.

To swivel the support bracket 30 between the said two operative positions, a pneumatic cylinder-piston unit 12 is provided fixed to the rear portion 10b, and having its lower end pivoted to the fixed bed 10 and its upper end pivoted to the bracket 30 at a point distant from the axis A. There is also provided a hydraulically operated catch 13 fixed to the rear inner surface of the bracket 30 to insert, on command, a pin thereof into a pair of seats (into one seat at a time) located in the rear portion 10a of the bed, to stabilize the position of the bracket 30 relative to the bed 10 when in each of its operative positions.

The machine also comprises usual bead release means connected to the fixed bed 10 in such a manner as to be able to assume a working position, in which these means are operative on the wheel 20 positioned in the working station P in the first operative position, and a second retracted position alternately where the means is removed from use.

A support frame 40 is provided composed of a horizontal transverse beam 42 and a longitudinal beam 43 butt-joined to the beam 42 to form a T. The horizontal beam 42 carries horizontal guide rails 44 on which two bead release means 45 are slidingly engaged; each of these comprises a shank 45a slidingly fitted onto the rails 44 and carrying a rotatable bead release disc 45b. The bead release means 45 can slidingly move along the rails 44, their position being controlled by cylinder-piston units 46 of horizontal axis, which are carried by the beam 42 and move the means 45 away from and towards each other.

The free rear end of the longitudinal beam 43 is hinged, by hinges 43a, to the fixed bed 10 on a horizontal axis of rotation D, to be able to swivel between the working position and the retracted position.

In said working position (shown in FIGS. 1, 2 and 3) the support frame 40 is virtually horizontal and the bead release means 45 project downwards, to the sides of the tire 22, in order to be able to operate on this in the usual manner when the bracket 30 is in the position in which the axis B is horizontal.

In said retracted position (shown in FIGS. 1A, 2A and 3A) the support frame 40 is raised upwards, with the longitudinal beam 43 in a virtually vertical position, and the bead release means 45 are above the working station P, in order not to hinder the tire mounting and removal operations carried out in the station P.

The machine also comprises tire mounting/removal tool holder means 50 connected to the fixed bed 10 in such a manner as to be able to assume a working position, in which they are operative on the wheel 20 positioned in the working station P in the second operative position, and a second retracted position where the tool holder means is removed from use alternately.

The rear end of the horizontal arm 52 is associated in an axially slidable manner with a sleeve 60 of horizontal axis, which is fixed to a bush 601 pivoted on a pin 602 of vertical axis fixed to the fixed bed 10; the horizontal arm 52 can therefore swivel, about a vertical axis of rotation F, between said working position and said retracted position.

A second cylinder-piston unit 59 is also provided, housed in the rear portion 10a of the bed, to vertically move the position of the pivoted bush 601, to provide a second means of vertically moving the turret 51.

When in its working position (shown in FIGS. 1A, 2A and 3A), the vertical turret 51 is located in the working station P, above the wheel 20 fixed to the mandrel 32, to be able to operate on the wheel fixed to the mandrel when the bracket 30 is in the position with its axis B vertical, in order to remove and mount the tire 22 from and onto the wheel rim 21 in the usual manner.

When in said retracted position (shown in FIGS. 1, 2 and 3), the vertical turret 51 has been rotated to the side of and outside the working station P, in order not to hinder the operations in the station P for releasing the bead of the tire 22.

To pass from its working position to its retracted position and vice versa, the tool holder means 50 is swivelled about the axis F by a cylinder-piston unit 61 pivoted at one end to the rear portion 10a of the bed and at its other end to a lever arm 62 fixed to the sleeve 60. As the wheel remains always in the same station P, both for bead release and for tire mounting/removal, the operator is not required to shift position, hence working faster and with less effort.

Moreover, as the plan dimensions of the working station are only slightly greater than the diameter of the wheel 20, and as the tools which operate on the wheel lie vertically above the station P to the side of the bed 10, even when in their exclusion position, the overall plan dimensions of the machine are very small. Numerous modifications of a practical and applicational nature can be made to the invention, but without leaving the scope of the inventive idea as claimed below.

What is claimed is:

1. A tire removal machine comprising:

a single working station having a fixed machine bed;

a mandrel unit rotatably engaged on the fixed machine bed;

a mandrel rotably engaged on the mandrel unit and having locking means adapted to rigidly lock a wheel rim carrying a tire on the mandrel;

means for rotating the mandrel unit around an axis thereof between a first operative position where an axis of the mandrel is horizontal and a second operative position where the axis of the mandrel is vertical;

bead release means engaged to the fixed machine bed moveable between a first working position where the bead release means can engage the tire when the mandrel unit is in the first operative position and a first retracted position where the bead release means is removed from use; and tire mounting or removal means engaged to the fixed machine bed movable between a second working position where the tire mounting and removal means can engage the tire when the mandrel unit is in the second operative position and a second retracted position where the tire mounting or removal means is removed from use.

2. The tire removal machine according to claim 1, wherein the fixed machine bed comprises an upwardly extending rear portion and a substantially horizontal flat base.

3. The tire removal machine according to claim 2 wherein a support bracket on which the mandrel is rotatably engaged on the upwardly extending rear portion of the fixed machine bed around a horizontal axis thereof which intersects the axis of the mandrel near the locking means.

4. The tire removal machine according to claim 2 wherein the mandrel further comprises a motorized shaft having a threaded free end and a counteracting element fixed on the shaft, wherein the locking means engages the threaded end to lock the wheel rim rigidly against the counteracting element.

5. The tire removal machine according to claim 1, wherein the bead release means comprise a support frame rotatably engaged on the fixed machine bed on a horizontal axis of rotation, said support frame having a horizontal beam carrying horizontal guide means on which bead release elements are slidingly engaged, said support frame being rotatable between said first working position where the support frame is substantially horizontal, and said first retracted position, where the support frame is raised upwards into a substantially vertical position.

6. The tire removal machine according to claim 1, wherein said tire mounting and removal means comprise a vertical turret slidably engaged to an end of a telescopic horizontal bar, said horizontal bar being rotatably engaged to the fixed machine bed on a vertical axis of rotation to rotate between said second working position, where the vertical turret lies in the working station above the wheel rim fixed to the mandrel, and said second retracted position where the vertical turret lies to a side of the working station.

* * * * *